(12) United States Patent
Wang et al.

(10) Patent No.: US 10,440,253 B2
(45) Date of Patent: Oct. 8, 2019

(54) FOCUSING METHOD AND TERMINAL (71) Applicant: Yulong Computer Telecommunication Scientific (Shenzhen) Co., Ltd., Shenzhen, Guangdong (CN)

(72) Inventors: Jian Wang, Guangdong (CN); Zhiyuan Ye, Guangdong (CN)

(73) Assignee: Yulong Computer Telecommunications Scientific (Shenzhen) Co., Ltd., Shenzhen (CN)

( * ) Notice: Subject to any disclaimer, the term of this patent is extended or adjusted under 35 U.S.C. 154(b) by 313 days.

(21) Appl. No.: 15/412,298

(22) Filed: Jan. 23, 2017

(65) Prior Publication Data

US 2017/0134640 A1 May 11, 2017

Related U.S. Application Data

(63) Continuation-in-part of application No. PCT/CN2014/083359, filed on Jul. 30, 2014.

(51) Int. Cl.
| | |
|---|---|
| H04N 5/232 | (2006.01) |
| G02B 7/06 | (2006.01) |
| G02B 7/28 | (2006.01) |
| G06F 3/0484 | (2013.01) |
| G06F 3/0488 | (2013.01) |
| H04N 5/225 | (2006.01) |

(52) U.S. Cl.
CPC .......... *H04N 5/23212* (2013.01); *G02B 7/06* (2013.01); *G02B 7/28* (2013.01); *G06F 3/04842* (2013.01); *G06F 3/04883* (2013.01); *H04N 5/2258* (2013.01); *H04N 5/23216* (2013.01); *H04N 5/23293* (2013.01)

(58) Field of Classification Search
CPC .......... H04N 5/23212; H04N 5/23293; H04N 5/23216; H04N 5/2258; G06F 3/04883; G06F 3/04842; G02B 7/06; G02B 7/28
USPC ....................................... 348/333.01–333.08
See application file for complete search history.

(56) References Cited

U.S. PATENT DOCUMENTS

| | | | |
|---|---|---|---|
| 2012/0105579 A1* | 5/2012 | Jeon | ..................... H04N 5/2258 348/38 |
| 2012/0120277 A1 | 5/2012 | Tsai | |
| 2014/0160245 A1 | 6/2014 | Cheng | |

FOREIGN PATENT DOCUMENTS

| | | |
|---|---|---|
| CN | 102511013 A | 6/2012 |
| CN | 103312979 A | 9/2013 |

(Continued)

*Primary Examiner* — Yogesh K Aggarwal
(74) *Attorney, Agent, or Firm* — Young Basile Hanlon & MacFarlane, P.C.

(57) ABSTRACT

A method and a terminal for focusing includes: a determining step, determining a first camera focus of two camera focuses of two cameras corresponding to a first touch point of two touch points and a second camera focus of the two camera focuses of the two cameras corresponding to a second touch point of the two touch points, respectively, when a shooting preview interface corresponding to the two cameras is displayed and the two touch points are detected on the shooting preview interface; and a focus adjustment step, adjusting position of the first camera focus and the second camera focus, respectively, according to a sliding trace of the first touch point and a sliding trace of the second touch point on the shooting preview interface, in which the first camera focus and the second camera focus are on a same straight line.

20 Claims, 5 Drawing Sheets

(56) References Cited

FOREIGN PATENT DOCUMENTS

| | | | |
|---|---|---|---|
| CN | 103763477 | A | 4/2014 |
| EP | 2728852 | A2 | 5/2014 |
| JP | 2010204483 | A | 9/2010 |

* cited by examiner

FOCUSING METHOD AND TERMINAL

CROSS-REFERENCE TO RELATED APPLICATION(S)

This application is a continuation-in-part of international Patent Application No. PCT/CN2014/083359 filed on Jul. 30, 2014, the content of which is hereby incorporated by reference in its entirety.

TECHNICAL FIELD

The present disclosure relates to the technical field of dual camera terminals and particularly to a focusing method and a terminal.

BACKGROUND

Presently, when a user uses a terminal having a single camera to take photos, if the close range view need to be photographed, the distant view can become blurred. If the distant view need to be photographed, the close range view can become blurred.

When the user uses a terminal having two cameras to take photos, if the two cameras cannot focus simultaneously, the user experience need to be improved.

Therefore, what is needed is a new technical solution. By means of the technical solution, two cameras can focus simultaneously, the user can obtain high-quality and high-definition photos by the two cameras, thereby achieving the purpose of improving user experience.

SUMMARY

Based on the above problems, a new technical solution is provided. By means of the technical solution, two cameras can focus simultaneously, thus users can obtain high-quality and high-definition photos via two cameras, thereby achieving the purpose of improving user experience.

In an aspect of the present disclosure, a focusing method is provided. The focusing method is applied in a terminal having two cameras. The two cameras are arranged in one side of the terminal. The focusing method includes: a determining step, determining a first camera focus of two camera focuses of two cameras corresponding to a first touch point of two touch points and a second camera focus of the two camera focuses of the two cameras corresponding to a second touch point of the two touch points respectively when a shooting preview interface corresponding to the two cameras is displayed and the two touch points are detected on the shooting preview interface; and a focus adjustment step, adjusting position of the first camera focus and the second camera focus respectively according to a sliding trace of the first touch point and a sliding trace of the second touch point on the shooting preview interface, wherein the first camera focus and the second camera focus are on a same straight line.

In another aspect of the present disclosure, a terminal is provided. The terminal includes two cameras, a memory storing a plurality of computer-readable program codes, and a processor configured to invoke the plurality of computer-readable program codes to execute following operations: a determining step, determining a first camera focus of two camera focuses of two cameras corresponding to a first touch point of two touch points and a second camera focus of the two camera focuses of the two cameras corresponding to a second touch point of the two touch points respectively when a shooting preview interface corresponding to the two cameras is displayed and the two touch points are detected on the shooting preview interface; and a focus adjustment step, adjusting position of the first camera focus and the second camera focus respectively according to a sliding trace of the first touch point and a sliding trace of the second touch point on the shooting preview interface, wherein the first camera focus and the second camera focus are on a same straight line.

In a further aspect of the present disclosure, a non-volatile machine-readable storage medium is provided. The storage medium stores a plurality of computer-readable program codes, and the plurality of computer-readable program codes are invoked by a terminal having two cameras to execute following operations: a determining step, determining a first camera focus of two camera focuses of the two cameras corresponding to a first touch point of two touch points and a second camera focus of the two camera focuses of the two cameras corresponding to a second touch point of the two touch points respectively when a shooting preview interface corresponding to the two cameras is displayed and the two touch points are detected on the shooting preview interface; and a focus adjustment step, adjusting position of the first camera focus and the second camera focus respectively according to a sliding trace of the first touch point and a sliding trace of the second touch point on the shooting preview interface, wherein the first camera focus and the second camera focus are on a same straight line.

By means of the above technical solution, two cameras can be controlled to focus simultaneously by two touch points, thus users can obtain high-quality and high-definition photos by two cameras, thereby achieving the purpose of improving user experience.

DETAILED DESCRIPTION

To understand the above-mentioned purposes, features and advantages of the present disclosure more clearly, the present disclosure will be further described in detail below in combination with the accompanying drawings and the specific implementations. It should be noted that, the implementations of the present application and the features in the implementations may be combined with one another without conflicts.

Many specific details will be described below for sufficiently understanding the present disclosure. However, the present disclosure may also be implemented by adopting other manners different from those described herein. Accordingly, the protection scope of the present disclosure is not limited by the specific implementations disclosed below.

Figure 1:
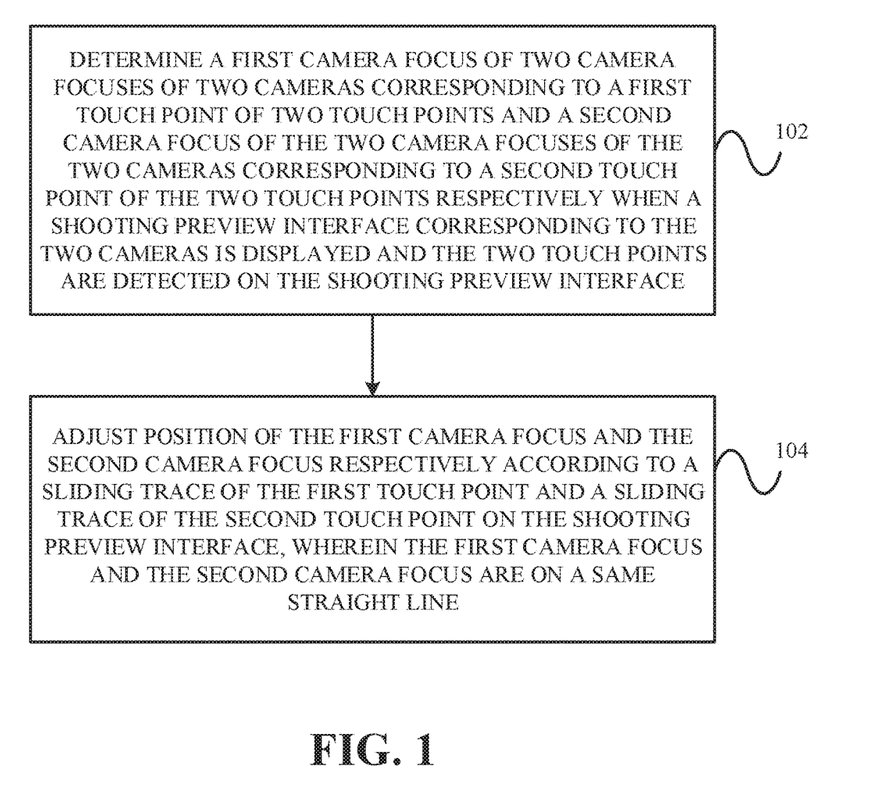
FIG. 1 is a schematic flow chart of a focusing method in accordance with an implementation of the present disclosure.

FIG. 1 is a schematic flow chart of a focusing method in accordance with an implementation of the present disclosure.

As illustrated by FIG. 1, a focusing method in accordance with an implementation of the present disclosure includes: a determining step 102, determining a first camera focus of two camera focuses of two cameras corresponding to a first touch point of two touch points and a second camera focus of the two camera focuses of the two cameras corresponding to a second touch point of the two touch points respectively when a shooting preview interface corresponding to the two cameras is displayed and the two touch points are detected on the shooting preview interface; and a focus adjustment step 104, adjusting position of the first camera focus and the second camera focus respectively according to a sliding trace of the first touch point and a sliding trace of the second touch point on the shooting preview interface, wherein the first camera focus and the second camera focus are on a same straight line.

In the technical solution, when a terminal detects that the shooting preview interface includes two touch points, the terminal determines the camera focuses each corresponding to one of the two touch points, thus controlling a camera focus by a touch point can be realized. At this point, if a user determines that the shooting preview interface corresponding to the two cameras is not clear enough, the user can slide the two touch points to adjust the two camera focuses each corresponding to one of the two touch points, thus it can be ensured that the two cameras can clearly focus simultaneously, thereby ensuring that high-definition composite photos can be obtained by the two cameras.

For example, when the user uses the two cameras to photograph the distant view and the close range view simultaneously, the user can slide the two touch points to cause the camera to focus simultaneously. That is, by sliding one of the two touch points, the focus of one of the two cameras is adjusted to photograph the distant view, and by sliding the other of the two touch points, the focus of the other of the two cameras is adjusted to photograph the close range view, thus the two cameras can clearly focus simultaneously, so that a photo the distant view and close range view of which are clear can be obtained.

In the above technical solution, preferably, the focus adjustment step includes: acquiring the sliding trace of the first touch point and the sliding trace of the second touch point respectively; determining a sliding direction and sliding horizontal displacement or sliding vertical displacement of the first touch point according to the sliding trace of the first touch point; determining a sliding direction and sliding displacement of the first camera focus in a preset displacement and direction conversion rule according to the sliding direction and sliding horizontal displacement or sliding vertical displacement of the first touch point; determining a sliding direction and sliding horizontal displacement or sliding vertical displacement of the second touch point according to the sliding trace of the second touch point; determining a sliding direction and sliding displacement of the second camera focus in the preset displacement and direction conversion rule according to the sliding direction and sliding horizontal displacement or sliding vertical displacement of the second touch point; adjusting the position of the first camera focus according to the sliding direction and sliding displacement of the first camera focus, and adjusting the position of the second camera focus according to the sliding direction and sliding displacement of the second camera focus.

In the technical solution, by determining the displacements and directions of the sliding traces of the two touch points, real time position of the two touch points can be accurately determined, thus real time position of the focuses of the two cameras can be accurately determined according to the real time position of the two touch points and the preset displacement and direction conversion rule.

In the above technical solution, preferably, the method further includes: moving the first camera focus to be close to or to be apart from the second camera focus when the first touch point is moved to be close to or apart from the second touch point, moving the second camera focus to be close to or to be apart from the first camera focus when the second touch point is moved to be close to or apart from the first touch point, and moving the first camera focus and the second camera focus to be close to or apart from each other when the first touch point and the second point are moved to be close to or apart from each other.

In the technical solution, a variation of the relative distance between the two camera focuses is the same as that of the relative distance between the two touch points. That is, when the relative distance between the first touch point and the second touch point reduces, the relative distance between the first camera focus and the second camera focus accordingly reduces. Such a consistent variation conforms to user thought, and the user is facilitated to adjust the focuses of the two cameras.

Certainly, the relationship between the variation of the relative distance between the two camera focuses and the variation of the relative distance between the two touch points includes but not limited to the above manner. For example, when the relative distance between the first touch point and the second touch point reduces, the relative distance between the first camera focus and the second camera focus can correspondingly increase.

In the above technical solution, preferably, the preset displacement and direction conversion rule includes: a displacement ratio between the sliding displacement of the first touch point and the sliding displacement of the first camera focus, a displacement ratio between the sliding displacement of the second touch point and the sliding displacement of the second camera focus, a corresponding relationship between the sliding direction of the first touch point and the sliding direction of the first camera focus, and a corresponding relationship between the sliding direction of the second touch point and the sliding direction of the second camera focus.

In the technical solution, the displacement ratios between the sliding displacements of the two touch points and the sliding displacements of the two camera focuses and the corresponding relationships between the sliding directions of the two touch points and the sliding directions of the two camera focuses are stored in the terminal beforehand. Thus, when the sliding traces of the two touch points change, the specific position of the two camera focuses corresponding to the two touch points can automatically change according to the variation of the sliding traces of the two touch points. Certainly, the user can adjust the displacement ratios and the corresponding relationships according to individual needs, so that different user requirements can be satisfied.

In the above technical solution, preferably, the determining step further includes: determining whether the position of the two camera focuses need to be adjusted according to a received focus selecting command when the shooting preview interface corresponding to the two cameras is displayed; and determining the first camera focus of the two camera focuses of the two cameras corresponding to the first touch point of the two touch points, and determining the second camera focus of the two camera focuses of the two cameras corresponding to the second touch point of the two touch points when the determination result is yes and the two touch points are detected on the shooting preview interface.

In the technical solution, the user can select to adjust or not adjust the position of the two camera focuses according to individual needs. For example, if the user determines that clear photos can be obtained when the two camera focuses of the terminal are in default position, the user can select to not adjust the two camera focuses. However, if the user selects to adjust the two camera focuses, the terminal can automatically adjust the position of the two camera focuses corresponding to the two touch points according to the position of the two touch points.

In the above technical solution, preferably, the method further includes: determining the first camera focus of the two camera focuses of the two cameras corresponding to the first touch point of the two touch points and the second camera focus of the two camera focuses of the two cameras corresponding to the second touch point of the two touch points according to the relative position between the two touch points and the relative position between the two cameras.

In the technical solution, the terminal can automatically determine the first camera focus corresponding to the first touch point and the second camera focus corresponding to the second touch point according to the relative position between the two touch points and the relative position between the two cameras. For example, when two touch points are detected on the interface, in a left-right corresponding manner, the left touch point is used to control the left camera, and the right touch point is used to control the right camera. FIGS. 2A-2D are schematic views of position variation relationships between the two touch points and position variation relationships between the two camera focuses.

Take photographing the moon and a person simultaneously as an example, the following description will illustrate the position variation relationship between the two touch points and the position variation relationship between the two camera focuses in conjunction with FIGS. 2A-2D. Firstly, it is assumed that the A camera is used to photograph the moon, and the B camera is used to photograph the person. The touch point 1 corresponds to the focus of the A camera, and the touch point 2 corresponds to the focus of the B camera.

Figure 2A:
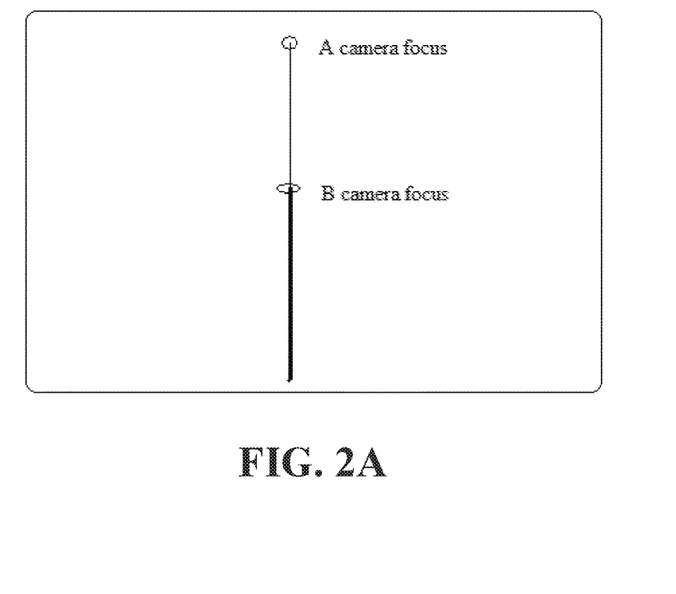
FIGS. 2A-2D are schematic views illustrating a position variation relationship between two touch points and a position variation relationship between two camera focuses in accordance with an implementation of the present disclosure.

When the user opens the A camera and the B camera, the initial position relationship between the focus of the A camera and the focus of the B camera is illustrated by FIG. 2A.

Figure 2B:
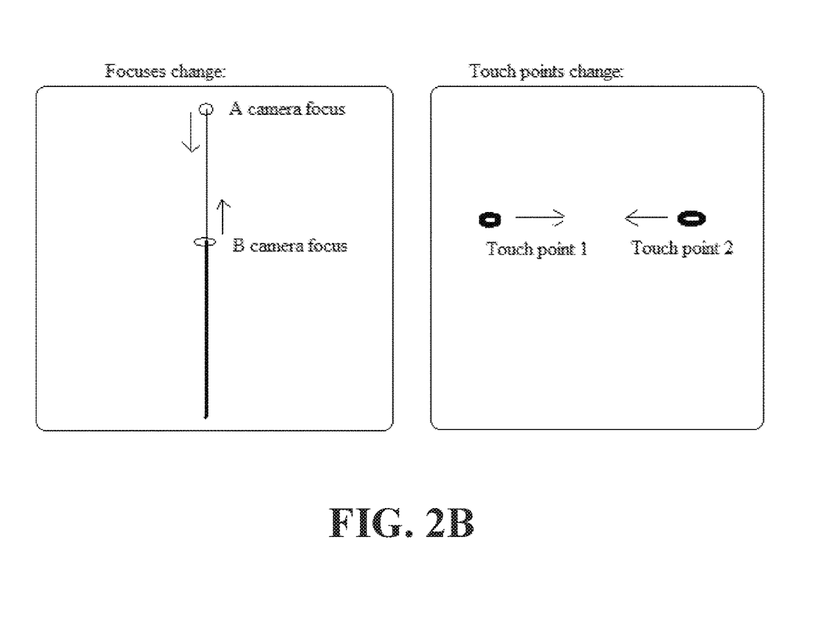

When the touch point 1 and the second touch point 2 are moved to be close to each other, the focus of the A camera and the focus of the B camera are also moved to be close to each other. The position relationship between the focus of the A camera and the focus of the B camera is illustrated by FIG. 2B.

Figure 2C:
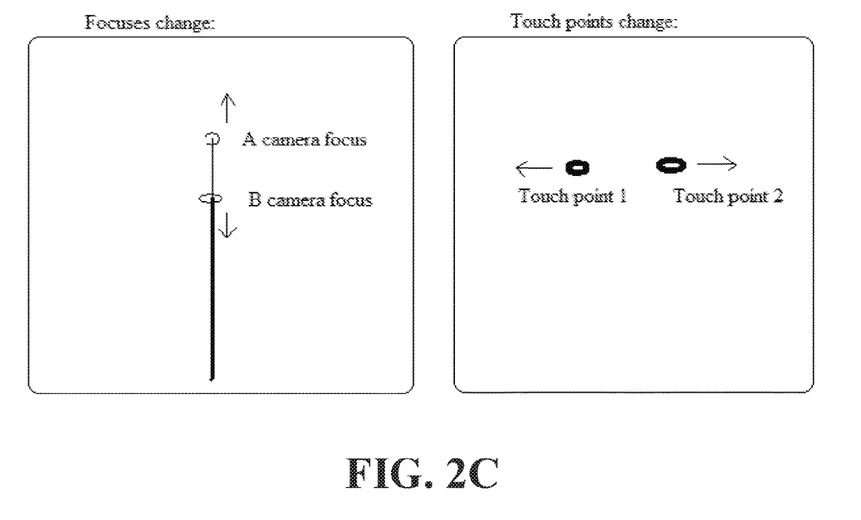

When the touch point 1 and the touch point 2 are moved to be apart from each other, the focus of the A camera and the focus of the B camera are also moved to be apart from each other. The position relationship between the focus of the A camera and the focus of the B camera is illustrated by FIG. 2C.

Figure 2D:
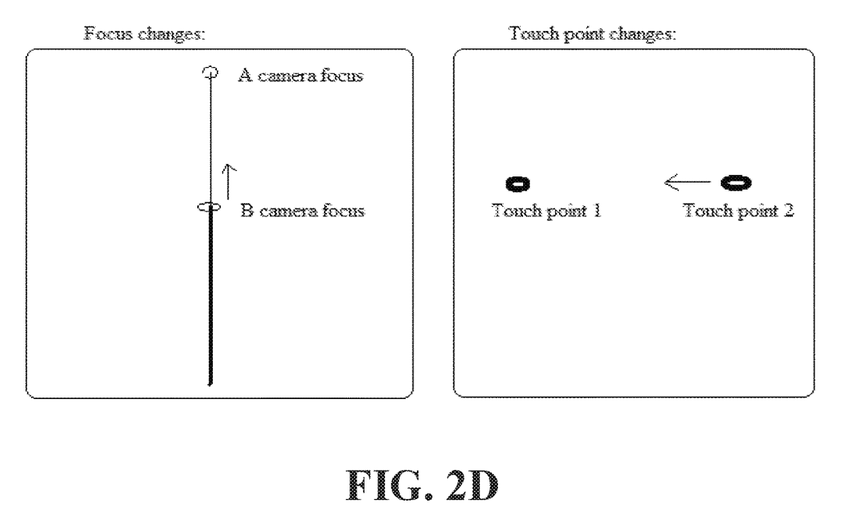

When the touch point 1 is not moved, and the touch point 2 is moved to be close to the touch point 1, the focus of the A camera is not moved, and the focus of the B camera is moved to be close to the focus of the A camera. The position relationship between the focus of the A camera and the focus of the B camera is illustrated by FIG. 2D.

As illustrated by FIGS. 2A-2D, a variation of the relative distance between the two camera focuses is the same as that of the relative distance between the two touch points. That is, when the relative distance between the first touch point and the second touch point reduces, the relative distance between the first camera focus and the second camera focus accordingly reduces. When the relative distance between the first touch point and the second touch point increases, the relative distance between the first camera focus and the second camera focus accordingly increases. Such a consistent variation conforms to user thought of the user, and the user is facilitated to adjust the two camera focuses.

Figure 3:
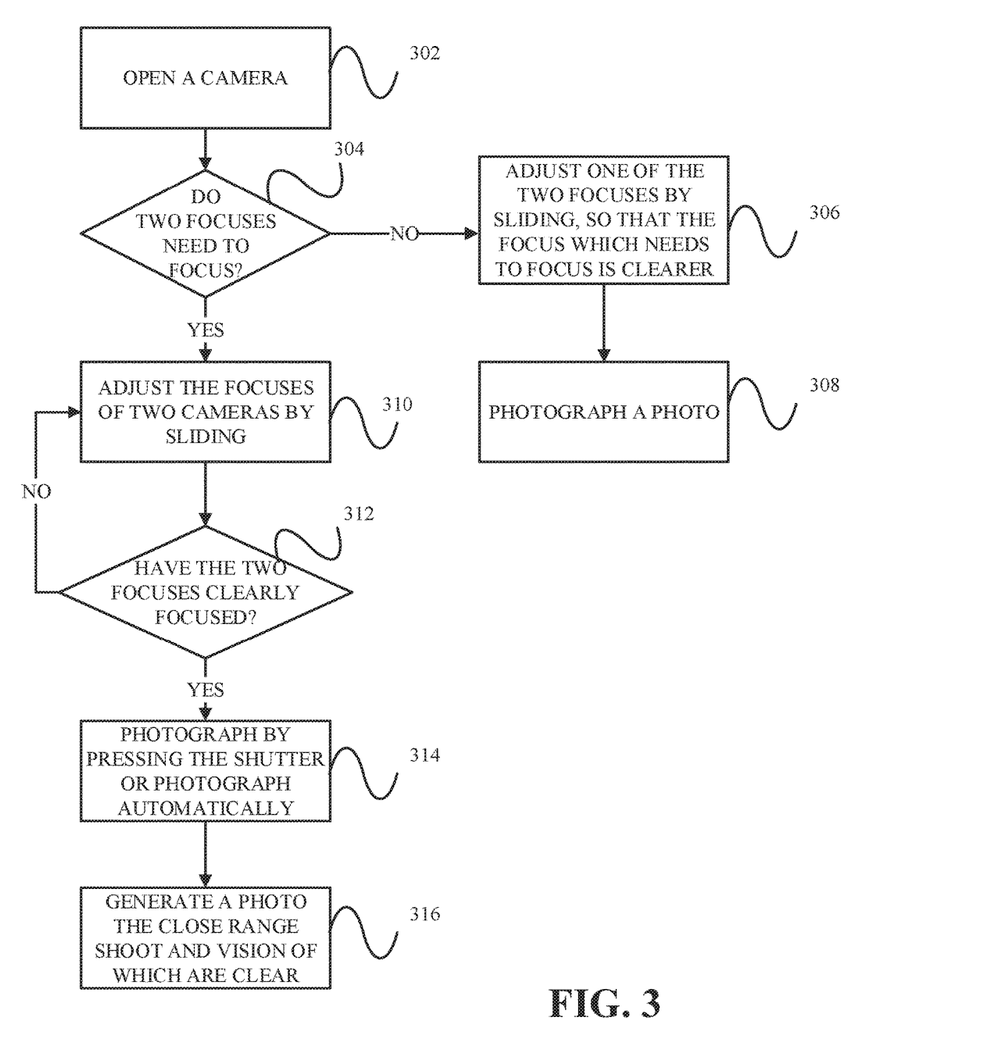
FIG. 3 is a schematic flow chart of a focusing method in accordance with another implementation of the present disclosure.

FIG. 3 is a schematic flow chart of a focusing method in accordance with another implementation of the present disclosure.

Step 302, a camera is opened by a user.

Step 304, whether two focuses need to focus is determined by the user. When not, step 306 is executed, otherwise step 310 is executed.

Step 306, a touch point which needs to be adjusted is slid to adjust the focus which needs to focus again, so that the focusing of the focus which needs to focus is clearer.

Step 308, a photo is photographed after focusing.

Step 310, the two touch points are slid to adjust the focuses of the two cameras.

Step 312, whether clear focusing of the two focuses is realized is determined. When the determination result is no, step 310 is executed, and when the determination result is yes, step 314 is executed.

Step 314, photographing by pressing the shutter manually or automatic photographing is executed.

Step 316, a photo the definition of the distant view and close range view of which is high is obtained.

Figure 4:
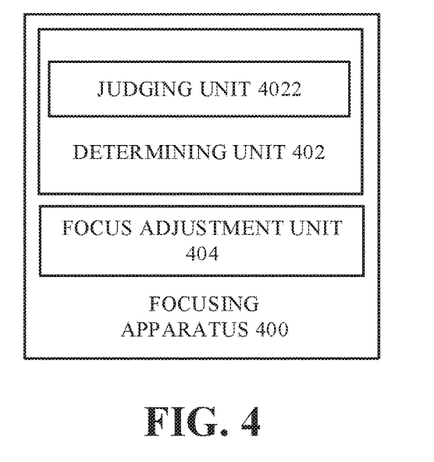
FIG. 4 is a diagrammatic view of a focusing apparatus in accordance with an implementation of the present disclosure.

FIG. 4 is a diagrammatic view of a focusing apparatus in accordance with an implementation of the present disclosure.

As illustrated by FIG. 4, a focusing apparatus 400 in accordance with an implementation of the present disclosure includes a determining unit 402 configured to determine a first camera focus of two camera focuses of two cameras corresponding to a first touch point of two touch points and a second camera focus of the two camera focuses of the two cameras corresponding to a second touch point of the two touch points respectively when a shooting preview interface corresponding to the two cameras is displayed and the two touch points are detected on the shooting preview interface, and a focus adjustment unit 404 coupled to the determining unit 402 and configured to adjust position of the first camera focus and the second camera focus respectively according to a sliding trace of the first touch point and a sliding trace of the second touch point on the shooting preview interface, wherein the first camera focus and the second camera focus are on a same straight line.

In the technical solution, when a terminal detects that the shooting preview interface includes two touch points, the terminal determines the camera focuses each corresponding to one of the two touch points, thus controlling a camera focus by a touch point can be realized. At this point, if a user determines that the shooting preview interface corresponding to the two cameras is not clear enough, the user can slide the two touch points to adjust the two camera focuses each corresponding to one of the two touch points, thus it can be ensured that the two cameras can clearly focus simultaneously, thereby ensuring that high-definition composite photos can be obtained by the two cameras.

For example, when the user uses the two cameras to photograph the distant view and the close range view simultaneously, the user can slide the two touch points to cause the camera to focus simultaneously. That is, by sliding one of the two touch points, the focus of one of the two cameras is adjusted to photograph the distant view, and by sliding the other of the two touch points, the focus of the other of the two cameras is adjusted to photograph the close range view, thus the two cameras can clearly focus simultaneously, so that a photo the distant view and close range view of which are clear can be obtained.

In the above technical solution, preferably, the focus adjustment unit 404 is configured to acquire the sliding trace of the first touch point and the sliding trace of the second touch point respectively, determine a sliding direction and sliding horizontal displacement or sliding vertical displacement of the first touch point according to the sliding trace of the first touch point, determine a sliding direction and sliding displacement of the first camera focus in a preset displacement and direction conversion rule according to the sliding direction and sliding horizontal displacement or sliding vertical displacement of the first touch point, determine a sliding direction and sliding horizontal displacement or sliding vertical displacement of the second touch point according to the sliding trace of the second touch point, determine a sliding direction and sliding displacement of the second camera focus in the preset displacement and direction conversion rule according to the sliding direction and sliding horizontal displacement or sliding vertical displacement of the second touch point, adjust the position of the first camera focus according to the sliding direction and sliding displacement of the first camera focus, and adjust the position of the second camera focus according to the sliding direction and sliding displacement of the second camera focus.

In the technical solution, by determining the displacements and directions of the sliding traces of the two touch points, real time position of the two touch points can be accurately determined, thus real time position of the focuses of the two cameras can be accurately determined according to the real time position of the two touch points and the preset displacement and direction conversion rule.

In the above technical solution, preferably, the focus adjustment unit 404 is further configured to move the first camera focus to be close to or to be apart from the second camera focus when the first touch point is moved to be close to or apart from the second touch point, move the second camera focus to be close to or to be apart from the first camera focus when the second touch point is moved to be close to or apart from the first touch point, and move the first camera focus and the second camera focus to be close to or apart from each other when the first touch point and the second point are moved to be close to or apart from each other.

In the technical solution, a variation of the relative distance between the two camera focuses is the same as that of the relative distance between the two touch points. That is, when the relative distance between the first touch point and the second touch point reduces, the relative distance between the first camera focus and the second camera focus accordingly reduces. Such a consistent variation conforms to user thought, and the user is facilitated to adjust the focuses of the two cameras.

Certainly, the relationship between the variation of the relative distance between the two camera focuses and the variation of the relative distance between the two touch points includes but not limited to the above manner. For example, when the relative distance between the first touch point and the second touch point reduces, the relative distance between the first camera focus and the second camera focus can correspondingly increase.

In the above technical solution, preferably, the preset displacement and direction conversion rule includes: a displacement ratio between the sliding displacement of the first touch point and the sliding displacement of the first camera focus, a displacement ratio between the sliding displacement of the second touch point and the sliding displacement of the second camera focus, a corresponding relationship between the sliding direction of the first touch point and the sliding direction of the first camera focus, and a corresponding relationship between the sliding direction of the second touch point and the sliding direction of the second camera focus.

In the technical solution, the displacement ratios between the sliding displacements of the two touch points and the sliding displacements of the two camera focuses and the corresponding relationships between the sliding directions of the two touch points and the sliding directions of the two camera focuses are stored in the terminal beforehand. Thus, when the sliding traces of the two touch points change, the specific position of the two camera focuses corresponding to the two touch points can automatically change according to the variation of the sliding traces of the two touch points. Certainly, the user can adjust the displacement ratios and the corresponding relationships according to individual needs, so that different user requirements can be satisfied.

In the above technical solution, preferably, the determining unit 402 further includes a judging unit 4022 configured to determine whether the position of the two camera focuses need to be adjusted according to a received focus selecting command when the shooting preview interface corresponding to the two cameras is displayed. The determining unit 402 is further configured to determine the first camera focus of the two camera focuses of the two cameras corresponding to the first touch point of the two touch points, and determine the second camera focus of the two camera focuses of the two cameras corresponding to the second touch point of the two touch points when the determination result is yes and the two touch points are detected on the shooting preview interface.

In the technical solution, the user can select to adjust or not adjust the position of the two camera focuses according to individual needs. For example, if the user determines that a clear photo can be obtained when the two camera focuses of the terminal are in default position, the user can select to not adjust the two camera focuses. However, if the user selects to adjust the two camera focuses, the terminal can automatically adjust the position of the two camera focuses corresponding to the two touch points according to the position of the two touch points.

In the above technical solution, preferably, the determining unit 402 is further configured to determine the first camera focus of the two camera focuses of the two cameras corresponding to the first touch point of the two touch points and the second camera focus of the two camera focuses of the two cameras corresponding to the second touch point of the two touch points according to the relative position between the two touch points and the relative position between the two cameras.

In the technical solution, the terminal can automatically determine the first camera focus corresponding to the first touch point and the second camera focus corresponding to the second touch point according to the relative position between the two touch points and the relative position between the two cameras. For example, when two touch points are detected on the interface, in a left-right corresponding manner, the left touch point is used to control the left camera, and the right touch point is used to control the right camera. Certainly, the implementation can be used in many scenarios. The following will use two specific application scenarios to further illustrate the applications of the implementation.

First Application Scenario

When a user wants to focus the distant view and the close range view simultaneously, the user can slide two touch points of a touch screen, so that the focuses can be accurately adjusted. The operation steps are following.

1) The user opens the camera and selects a scenario to be photographed.

2) The user determines two touch points of the touch screen. The user then slides the left touch point to adjust one focus to be a focus for photographing the close range view, and slides the right touch point to adjust the other focus to be a focus for photographing the distant view, so that accurate focusing can be realized.

3) After the two focuses focus clearly, when the user presses the shutter, a photo the distant view and close range view of which are clear can be obtained.

Second Application Scenario

When one focus is determined by the user, the user can slide the corresponding touch point of the touch screen to adjust the other focus, so that the focus can be accurately adjusted. The operation steps are following.

1) The user opens the camera and selects a scenario to be photographed.

2) When the camera automatically determines the left focus needed by the user, if the user wants to select another focus a distance between the scenario photographed by the focus and the user is less than that between the scenario photographed by the left focus and the user, the user can operate by one hand to slide the touch point toward left, so that clear focusing can be realized. If the user wants to select another focus a distance between the scenario photographed by the focus and the user is greater than that between the scenario photographed by the left focus and the user, the user can operate by one hand to slide the touch point toward right, so that clear focusing can be realized.

After the focus focuses clearly, when the user presses the shutter, a photo the distant view and close range view of which are clear can be obtained.

The above specifically illustrate the technical solution of the present disclosure. By means of the technical solution of the present disclosure, two cameras can be controlled to focus simultaneously by two touch points, thus a user can obtain high-quality and high-definition photos by two cameras, thereby achieving the purpose of improving user experience.

Figure 5:
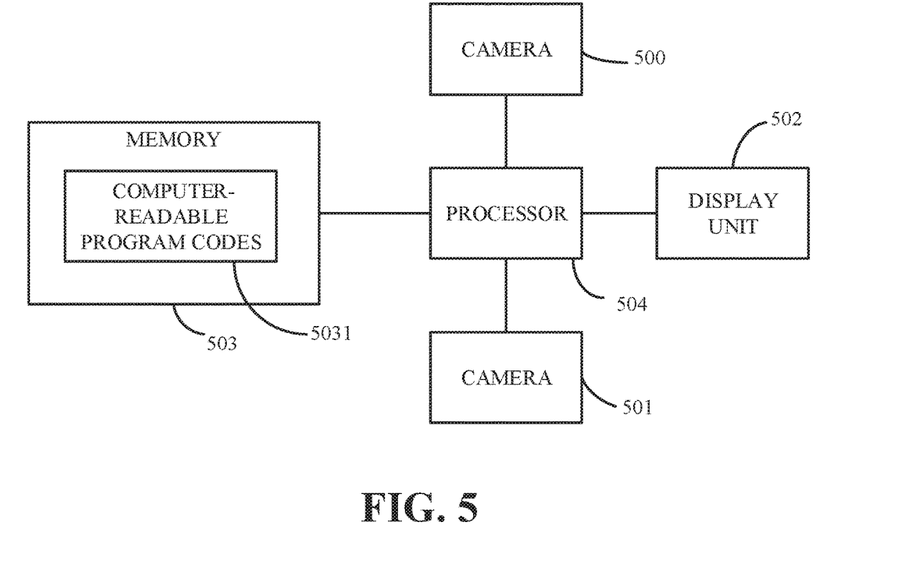
FIG. 5 is a diagrammatic view of a terminal having two cameras in accordance with an implementation of the present disclosure.

Referring to FIG. 5, FIG. 5 is a diagrammatic view of a terminal in accordance with an implementation of the present disclosure. The terminal includes two cameras 500 and 501, and can include but not limited to a display unit 502, a memory 503, and a processor 504. The display unit 502 and the memory 503 are electrically coupled to the processor 504.

The display unit 502 is configured to display visual information, such as text, image, for example. The display unit 502 may be a light emitting diode (LED) display screen or an organic light emitting diode (OLED) display screen.

The memory 503 is configured to store a plurality of computer-readable program codes 5031. The memory 503 can be a read only memory (ROM), a random access memory (RAM), a U-disk, a removable hard disk, etc.

The processor 504 can include multiple cores for multi-thread or parallel processing. In this implementation, the processor 504 is configured to invoke the plurality of computer-readable program codes 5031 to execute following operations: a determining step, determining a first camera focus of two camera focuses of the two cameras 500 and 501 corresponding to a first touch point of two touch points and a second camera focus of the two camera focuses of the two cameras 500 and 501 corresponding to a second touch point of the two touch points respectively when a shooting preview interface corresponding to the two cameras 500 and 501 is displayed and the two touch points are detected on the shooting preview interface; and a focus adjustment step, adjusting position of the first camera focus and the second camera focus respectively according to a sliding trace of the first touch point and a sliding trace of the second touch point on the shooting preview interface, wherein the first camera focus and the second camera focus are on a same straight line.

In an implementation, the focus adjustment step includes: acquiring the sliding trace of the first touch point and the sliding trace of the second touch point respectively; determining a sliding direction and sliding horizontal displacement or sliding vertical displacement of the first touch point according to the sliding trace of the first touch point; determining a sliding direction and sliding displacement of the first camera focus in a preset displacement and direction conversion rule according to the sliding direction and sliding horizontal displacement or sliding vertical displacement of the first touch point; determining a sliding direction and sliding horizontal displacement or sliding vertical displacement of the second touch point according to the sliding trace of the second touch point; determining a sliding direction and sliding displacement of the second camera focus in the preset displacement and direction conversion rule according to the sliding direction and sliding horizontal displacement or vertical displacement of the second touch point; and adjusting the position of the first camera focus according to the sliding direction and sliding displacement of the first camera focus, and adjusting the position of the second camera focus according to the sliding direction and sliding displacement of the second camera focus.

In an implementation, the processor 504 is further configured to invoke the plurality of computer-readable program codes 5031 to move the first camera focus to be close to or to be apart from the second camera focus when the first touch point is moved to be close to or apart from the second touch point, move the second camera focus to be close to or to be apart from the first camera focus when the second touch point is moved to be close to or apart from the first touch point, and move the first camera focus and the second camera focus to be close to or apart from each other when the first touch point and the second point are moved to be close to or apart from each other.

In an implementation, the preset displacement and direction conversion rule includes: a displacement ratio between the sliding displacement of the first touch point and the sliding displacement of the first camera focus and a displacement ratio between the sliding displacement of the second touch point and the sliding displacement of the second camera focus; and a corresponding relationship between the sliding direction of the first touch point and the sliding direction of the first camera focus and a corresponding relationship between the sliding direction of the second touch point and the sliding direction of the second camera focus.

In an implementation, the determining step further includes: determining whether the position of the two camera focuses need to be adjusted according to a received focus selecting command when the shooting preview interface corresponding to the two cameras is displayed; and determining the first camera focus of the two camera focuses of the two cameras 500 and 501 corresponding to the first touch point of the two touch points and the second camera focus of the two camera focuses of the two cameras 500 and 501 corresponding to the second touch point of the two touch points when the determination result is yes and the two touch points are detected on the shooting preview interface.

In an implementation, the processor 504 is further configured to invoke the plurality of computer-readable program codes 5031 to determine the first camera focus of the two camera focuses of the two cameras 500 and 501 corresponding to the first touch point of the two touch points and the second camera focus of the two camera focuses of the two cameras 500 and 501 corresponding to the second touch point of the two touch points according to a relative position between the two touch points and a relative position between the two cameras 500 and 501.

According to an implementation of the present disclosure, a program product stored in a non-volatile machine-readable medium is further provided to realize focusing of a terminal. The program product includes executable instructions configured to cause a terminal having two cameras to execute following steps: determining a first camera focus of two camera focuses of two cameras corresponding to a first touch point of two touch points and a second camera focus of the two camera focuses of the two cameras corresponding to a second touch point of the two touch points respectively when a shooting preview interface corresponding to the two cameras is displayed and the two touch points are detected on the shooting preview interface; and adjusting position of the first camera focus and the second camera focus respectively according to a sliding trace of the first touch point and a sliding trace of the second touch point on the shooting preview interface, wherein the first camera focus and the second camera focus are on a same straight line.

According to an implementation of the present disclosure, a non-volatile machine-readable medium is further provided. The medium stores a program product for focusing of a terminal. The program product includes executable instructions configured to cause a terminal having two cameras to execute following steps: determining a first camera focus of two camera focuses of two cameras corresponding to a first touch point of two touch points and a second camera focus of the two camera focuses of the two cameras corresponding to a second touch point of the two touch points respectively when a shooting preview interface corresponding to the two cameras is displayed and the two touch points are detected on the shooting preview interface; and adjusting position of the first camera focus and the second camera focus respectively according to a sliding trace of the first touch point and a sliding trace of the second touch point on the shooting preview interface, wherein the first camera focus and the second camera focus are on a same straight line.

According to an implementation of the present disclosure, a machine-readable program is further provided. The program is configured to cause a machine to execute any of the focusing methods described above.

According to an implementation of the present disclosure, a storage medium storing a machine-readable program is further provided. Wherein, the machine-readable program is configured to cause a machine to execute any of the focusing methods described above.

The foregoing descriptions are merely implementations of the present disclosure, but are not intended to limit the protection scope of the present disclosure. For those skilled in the art, various alternations and variations can be made according to the present disclosure. Any modifications, equivalent substations, and improvements within the technical scope disclosed in the present disclosure should fall within the protection scope of the present disclosure.

What is claimed is:

1. A method for focusing applied in a terminal having two cameras, the two cameras being arranged in one side of the terminal, the method comprising:
   determining, by a processor of the terminal, a first camera focus of two camera focuses of the two cameras corresponding to a first touch point of two touch points and a second camera focus of the two camera focuses of the two cameras corresponding to a second touch point of the two touch points, respectively, when a shooting preview interface corresponding to the two cameras is displayed and the two touch points are detected on the shooting preview interface; and
   adjusting, by the processor of the terminal, a position of the first camera focus and a position of the second camera focus, respectively, according to a sliding trace of the first touch point, a sliding trace of the second touch point on the shooting preview interface, and a preset displacement and direction conversion rule, wherein the first camera focus and the second camera focus are on a same straight line,
   wherein the preset displacement and direction conversion rule comprises:
      a displacement ratio between a sliding displacement of the first touch point and a sliding displacement of the first camera focus and a displacement ratio between a sliding displacement of the second touch point and a sliding displacement of the second camera focus; and
      a corresponding relationship between a sliding direction of the first touch point and a sliding direction of the first camera focus and a corresponding relationship between a sliding direction of the second touch point and a sliding direction of the second camera focus.

2. The method of claim 1, wherein adjusting the position of the first camera focus and the position of the second camera focus, respectively comprises:
   acquiring, by the processor of the terminal, the sliding trace of the first touch point and the sliding trace of the second touch point, respectively;
   determining, by the processor of the terminal, the sliding direction and any of a sliding horizontal displacement and a sliding vertical displacement of the first touch point, according to the sliding trace of the first touch point;

determining, by the processor of the terminal, the sliding direction and a sliding displacement of the first camera focus in the preset displacement and direction conversion rule according to the sliding direction and any of the sliding horizontal displacement and the sliding vertical displacement of the first touch point;

determining, by the processor of the terminal, the sliding direction and any of a sliding horizontal displacement and a sliding vertical displacement of the second touch point, according to the sliding trace of the second touch point;

determining, by the processor of the terminal, the sliding direction and a sliding displacement of the second camera focus in the preset displacement and direction conversion rule according to the sliding direction and any of the sliding horizontal displacement and the sliding vertical displacement of the second touch point; and adjusting, by the processor of the terminal, the position of the first camera focus according to the sliding direction and the sliding displacement of the first camera focus, and adjusting the position of the second camera focus according to the sliding direction and the sliding displacement of the second camera focus.

3. The method of claim 2, further comprising:

moving, by the processor of the terminal, the first camera focus close to or apart from the second camera focus when the first touch point is moved close to or apart from the second touch point;

moving, by the processor of the terminal, the second camera focus close to or apart from the first camera focus when the second touch point is moved close to or apart from the first touch point; and moving, by the processor of the terminal, the first camera focus and the second camera focus close to or apart from each other when the first touch point and the second point are moved close to or apart from each other.

4. The method of claim 1, wherein a user can adjust at least one of the displacement ratio between the sliding displacement of the first touch point and the sliding displacement of the first camera focus, the displacement ratio between the sliding displacement of the second touch point and the sliding displacement of the second camera focus, the corresponding relationship between the sliding direction of the first touch point and the sliding direction of the first camera focus, or the corresponding relationship between the sliding direction of the second touch point and the sliding direction of the second camera focus.

5. The method of claim 1, wherein determining the first camera focus of two camera focuses of the two cameras corresponding to the first touch point of two touch points and the second camera focus of the two camera focuses of the two cameras corresponding to the second touch point of the two touch points, respectively, comprises:

determining, by the processor of the terminal, whether the positions of the two camera focuses need to be adjusted according to a received focus selecting command when the shooting preview interface corresponding to the two cameras is displayed; and determining, by the processor of the terminal, the first camera focus of the two camera focuses of the two cameras corresponding to the first touch point of the two touch points and the second camera focus of the two camera focuses of the two cameras corresponding to the second touch point of the two touch points when it is determined that the positions of the two camera focuses need to be adjusted and the two touch points are detected on the shooting preview interface.

6. The method of claim 1, wherein adjusting the position of the first camera focus and the position of the second camera focus, respectively, comprises:

determining, by the processor of the terminal, the first camera focus of the two camera focuses of the two cameras corresponding to the first touch point of the two touch points and the second camera focus of the two camera focuses of the two cameras corresponding to the second touch point of the two touch points according to a relative position between the two touch points and a relative position between the two cameras.

7. A terminal comprising:

two cameras;

a memory storing computer-readable program codes; and a processor configured to invoke the computer-readable program codes to:

determine a first camera focus of two camera focuses of the two cameras corresponding to a first touch point of two touch points and a second camera focus of the two camera focuses of the two cameras corresponding to a second touch point of the two touch points, respectively, when a shooting preview interface corresponding to the two cameras is displayed and the two touch points are detected on the shooting preview interface; and adjust a position of the first camera focus and a position of the second camera focus, respectively, according to a sliding trace of the first touch point and a sliding trace of the second touch point on the shooting preview interface and a preset displacement and direction conversion rule, wherein the first camera focus and the second camera focus are on a same straight line, wherein the preset displacement and direction conversion rule comprises a displacement ratio between a sliding displacement of the first touch point and a sliding displacement of the first camera focus and a displacement ratio between a sliding displacement of the second touch point and a sliding displacement of the second camera focus.

8. The terminal of claim 7, wherein the computer-readable program codes to adjust a position of the first camera focus and a position of the second camera focus, respectively comprise further codes to:

acquire the sliding trace of the first touch point and the sliding trace of the second touch point, respectively;

determine a sliding direction and any of a sliding horizontal displacement and a sliding vertical displacement of the first touch point, according to the sliding trace of the first touch point;

determine a sliding direction and a sliding displacement of the first camera focus in a preset displacement and direction conversion rule, according to the sliding direction and any of the sliding horizontal displacement and the sliding vertical displacement of the first touch point;

determine a sliding direction and any of a sliding horizontal displacement and a sliding vertical displacement of the second touch point, according to the sliding trace of the second touch point;

determine a sliding direction and a sliding displacement of the second camera focus in the preset displacement and direction conversion rule according to the sliding direction and any of the sliding horizontal displacement and the sliding vertical displacement of the second touch point; and adjust the position of the first camera focus according to the sliding direction and the sliding displacement of the first camera focus, and adjusting the position of the second camera focus according to the sliding direction and the sliding displacement of the second camera focus.

9. The terminal of claim 8, wherein the computer-readable program codes are further invoked by the processor to:

move the first camera focus close to or apart from the second camera focus when the first touch point is moved close to or apart from the second touch point;

move the second camera focus close to or apart from the first camera focus when the second touch point is moved close to or apart from the first touch point; and move the first camera focus and the second camera focus close to or apart from each other when the first touch point and the second point are moved close to or apart from each other.

10. The terminal of claim 8, wherein the preset displacement and direction conversion rule further comprises:

a corresponding relationship between the sliding direction of the first touch point and the sliding direction of the first camera focus and a corresponding relationship between the sliding direction of the second touch point and the sliding direction of the second camera focus.

11. The terminal of claim 7, wherein the computer-readable program codes to determine the first camera focus of two camera focuses of the two cameras corresponding to the first touch point of two touch points and the second camera focus of the two camera focuses of the two cameras corresponding to the second touch point of the two touch points, respectively, comprise further codes to:

determine whether the position of the two camera focuses need to be adjusted according to a received focus selecting command when the shooting preview interface corresponding to the two cameras is displayed; and determine the first camera focus of the two camera focuses of the two cameras corresponding to the first touch point of the two touch points and the second camera focus of the two camera focuses of the two cameras corresponding to the second touch point of the two touch points when it is determined that the positions of the two camera focuses need to be adjusted and the two touch points are detected on the shooting preview interface.

12. The terminal of claim 7, wherein the computer-readable program codes are further invoked by the processor to:

determine the first camera focus of the two camera focuses of the two cameras corresponding to the first touch point of the two touch points and the second camera focus of the two camera focuses of the two cameras corresponding to the second touch point of the two touch points according to a relative position between the two touch points and a relative position between the two cameras.

13. The terminal of claim 7, wherein at least one of the displacement ratio between the sliding displacement of the first touch point and the sliding displacement of the first camera focus or the displacement ratio between the sliding displacement of the second touch point and the sliding displacement of the second camera focus is user adjustable.

14. A non-volatile machine-readable storage medium storing computer-readable program codes, the computer-readable program codes being invoked by a terminal having two cameras to:

determine a first camera focus of two camera focuses of the two cameras corresponding to a first touch point of two touch points and a second camera focus of the two camera focuses of the two cameras corresponding to a second touch point of the two touch points, respectively, when a shooting preview interface corresponding to the two cameras is displayed and the two touch points are detected on the shooting preview interface; and adjust a position of the first camera focus and a position of the second camera focus, respectively, according to a sliding trace of the first touch point and a sliding trace of the second touch point on the shooting preview interface and a preset displacement and direction conversion rule, wherein the preset displacement and direction conversion rule comprises a corresponding relationship between a sliding direction of the first touch point and a sliding direction of the first camera focus and a corresponding relationship between a sliding direction of the second touch point and a sliding direction of the second camera focus.

15. The machine-readable storage medium of claim 14, wherein computer-readable program codes to adjust a position of the first camera focus and a position of the second camera focus, respectively comprise further codes to:

acquire the sliding trace of the first touch point and the sliding trace of the second touch point, respectively;

determine the sliding direction and any of a sliding horizontal displacement and a sliding vertical displacement of the first touch point, according to the sliding trace of the first touch point;

determine the sliding direction and a sliding displacement of the first camera focus in a preset displacement and direction conversion rule, according to the sliding direction and any of the sliding horizontal displacement and the sliding vertical displacement of the first touch point;

determine the sliding direction and any of a sliding horizontal displacement and a sliding vertical displacement of the second touch point according to the sliding trace of the second touch point;

determine the sliding direction and a sliding displacement of the second camera focus in the preset displacement and direction conversion rule according to the sliding direction and any of the sliding horizontal displacement and the sliding vertical displacement of the second touch point; and adjust the position of the first camera focus according to the sliding direction and the sliding displacement of the first camera focus, and adjusting the position of the second camera focus according to the sliding direction and the sliding displacement of the second camera focus.

16. The machine-readable storage medium of claim 15, wherein the computer-readable program codes are further invoked by the terminal to:

move the first camera focus close to or apart from the second camera focus when the first touch point is moved close to or apart from the second touch point;

move the second camera focus close to or apart from the first camera focus when the second touch point is moved close to or apart from the first touch point; and move the first camera focus and the second camera focus close to or apart from each other when the first touch point and the second point are moved close to or apart from each other.

17. The machine-readable storage medium of claim 15, wherein the preset displacement and direction conversion rule further comprises:

a displacement ratio between the sliding displacement of the first touch point and the sliding displacement of the first touch point and a displacement ratio between the sliding displacement of the second touch point and the sliding displacement of the second camera focus.

18. The machine-readable storage medium of claim 14, wherein the computer-readable program codes to determine the first camera focus of two camera focuses of the two cameras corresponding to the first touch point of two touch points and the second camera focus of the two camera focuses of the two cameras corresponding to the second touch point of the two touch points, respectively comprise further codes to:

determine whether the position of the two camera focuses need to be adjusted according to a received focus selecting command when the shooting preview interface corresponding to the two cameras is displayed; and determine the first camera focus of the two camera focuses of the two cameras corresponding to the first touch point of the two touch points and the second camera focus of the two camera focuses of the two cameras corresponding to the second touch point of the two touch points when it is determined that the positions of the two camera focuses are need to be adjusted and the two touch points are detected on the shooting preview interface.

19. The machine-readable storage medium of claim 14, wherein the computer-readable program codes are further invoked by the terminal to:

determine the first camera focus of the two camera focuses of the two cameras corresponding to the first touch point of the two touch points and the second camera focus of the two camera focuses of the two cameras corresponding to the second touch point of the two touch points according to a relative position between the two touch points and a relative position between the two cameras.

20. The machine-readable storage medium of claim 14, wherein at least one of the corresponding relationship between the sliding direction of the first touch point and the sliding direction of the first camera focus or the corresponding relationship between the sliding direction of the second touch point and the sliding direction of the second camera focus is user adjustable.

* * * * *